US009069485B2

(12) United States Patent
Manula et al.

(10) Patent No.: US 9,069,485 B2
(45) Date of Patent: Jun. 30, 2015

(54) DOORBELL BACKPRESSURE AVOIDANCE MECHANISM ON A HOST CHANNEL ADAPTER

(71) Applicant: Oracle International Corporation, Redwood City, CA (US)

(72) Inventors: Brian Edward Manula, Oslo (NO); Haakon Ording Bugge, Oslo (NO); Benny Sum, Decatur, GA (US)

(73) Assignee: Oracle International Corporation, Redwood Shores, CA (US)

( * ) Notice: Subject to any disclaimer, the term of this patent is extended or adjusted under 35 U.S.C. 154(b) by 47 days.

(21) Appl. No.: 13/721,720

(22) Filed: Dec. 20, 2012

(65) Prior Publication Data

US 2014/0181323 A1    Jun. 26, 2014

(51) Int. Cl.
*G06F 3/00* (2006.01)
*G06F 3/06* (2006.01)

(52) U.S. Cl.
CPC .................................... *G06F 3/0659* (2013.01)

(58) Field of Classification Search
USPC ............................................................ 710/5
See application file for complete search history.

(56) References Cited

U.S. PATENT DOCUMENTS

| | | | |
|---|---|---|---|
| 5,796,939 A * | 8/1998 | Berc et al. | 714/47.3 |
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,917,987 B2 | 7/2005 | Parthasarathy et al. | |
| 7,136,353 B2 | 11/2006 | Ha et al. | |
| 7,330,918 B2 | 2/2008 | Yamamoto et al. | |
| 7,496,698 B2 | 2/2009 | Biran et al. | |
| 7,609,636 B1 | 10/2009 | Mott | |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,787,366 B2 | 8/2010 | Cuffaro et al. | |
| 7,817,634 B2 | 10/2010 | Coffman et al. | |
| 7,830,919 B1 | 11/2010 | Thompson | |
| 7,899,050 B2 | 3/2011 | Craddock et al. | |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |

(Continued)

OTHER PUBLICATIONS

Pfister, Gregory; "An Introduction to the Infiniband Architecture"; IBM Enterprise Server Group, Chapter 42, pp. 617-632 (2002).

(Continued)

*Primary Examiner* — Chun-Kuan Lee
(74) *Attorney, Agent, or Firm* — Osha Liang LLP (57) ABSTRACT

A method for processing commands includes receiving, for multiple commands, doorbells for writing to a send queue scheduler buffer on a host channel adapter (HCA). The send queue scheduler buffer is associated with a send queue scheduler. The method further includes detecting a potential deadlock of the send queue scheduler from processing a portion of the doorbells, writing a subset of the doorbells to a doorbell overflow buffer on a host, operatively connected to the HCA, based on detecting the potential deadlock, and discarding the subset by the send queue scheduler without processing the subset of the plurality of doorbells before discarding.

17 Claims, 6 Drawing Sheets

(56) References Cited

U.S. PATENT DOCUMENTS

| | | | |
|---|---|---|---|
| 8,296,386 B1 | 10/2012 | Micalizzi, Jr. | |
| 8,375,145 B2 * | 2/2013 | Kagan et al. | 709/250 |
| 2001/0036185 A1 | 11/2001 | Dempo | |
| 2003/0101158 A1 | 5/2003 | Pinto et al. | |
| 2005/0018669 A1 | 1/2005 | Arndt et al. | |
| 2005/0060443 A1 | 3/2005 | Rosner | |
| 2005/0135419 A1 | 6/2005 | Pullen et al. | |
| 2005/0223118 A1 | 10/2005 | Tucker et al. | |
| 2007/0008886 A1 | 1/2007 | Chen et al. | |
| 2007/0019665 A1 | 1/2007 | Benveniste | |
| 2007/0165672 A1 | 7/2007 | Keels et al. | |
| 2007/0223472 A1 | 9/2007 | Tachibana et al. | |
| 2007/0223483 A1 | 9/2007 | Huang et al. | |
| 2007/0242686 A1 | 10/2007 | Zegers et al. | |
| 2008/0140984 A1 | 6/2008 | Shearer | |
| 2008/0168194 A1 | 7/2008 | Gregg et al. | |
| 2009/0125604 A1 | 5/2009 | Chang et al. | |
| 2011/0216648 A1 | 9/2011 | Mehrotra et al. | |
| 2012/0239832 A1 | 9/2012 | Subramanian et al. | |

OTHER PUBLICATIONS

Shanley, Tom; "Infiniband Network Architecture", MindShare, Inc., Chapter 1, pp. 9-24 (2003).

Shanley, Tom; "Infiniband Network Architecture", MindShare, Inc., Chapters 3-6, pp. 31-129 (2003).

Shanley, Tom; "Infiniband Network Architecture", MindShare, Inc., Chapter 13, pp. 259-289 (2003).

* cited by examiner

DOORBELL BACKPRESSURE AVOIDANCE MECHANISM ON A HOST CHANNEL ADAPTER

CROSS REFERENCE TO RELATED APPLICATIONS

The present application contains subject matter that may be related to the subject matter in the following U.S. patent application, which is assigned to a common assignee and is incorporated by reference in its entirety: U.S. patent application Ser. No. 13/149,436, entitled "METHOD AND SYSTEM FOR PROCESSING COMMANDS ON AN INFINIBAND® HOST CHANNEL ADAPTOR."

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made of a collection of switches, routers, and/or links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using queue pairs. A queue pair includes a send queue and a receive queue. Specifically, a queue pair defines communication channels between the two processes. More specifically, an application uses the send queue to receive messages and the receive queue to send messages. The send queue and receive queue on the same host that is used by the process to communicate with another process form a queue pair. Each queue pair may have a corresponding queue pair with which to communicate. Specifically, in order for a process to send a message to another process, the process posts the message to the send queue. The host channel adapter forwards the message to the receive queue of the corresponding queue pair. Each packet that is sent may include a packet sequence number. Logic associated with the receive queue ensures that packets are processed in a particular order using the packet sequence number.

SUMMARY

In general, in one aspect, the invention relates to a method for processing commands. The method includes receiving, for multiple commands, doorbells for writing to a send queue scheduler buffer on a host channel adapter (HCA). The send queue scheduler buffer is associated with a send queue scheduler. The method further includes detecting a potential deadlock of the send queue scheduler from processing a portion of the doorbells, writing a subset of the doorbells to a doorbell overflow buffer on a host, operatively connected to the HCA, based on detecting the potential deadlock, and discarding the subset by the send queue scheduler without processing the subset of the plurality of doorbells before discarding.

In general, in one aspect, the invention relates to a host channel adapter (HCA) for processing commands. The host channel adapter includes a send queue scheduler buffer and a send queue scheduler. The send queue scheduler buffer is configured to store at least a portion of multiple doorbells corresponding to multiple commands. The send queue scheduler, is operatively connected to the send queue scheduler buffer, and is configured to receive, for the commands, the doorbells for writing to the send queue scheduler buffer, detect a potential deadlock of the send queue scheduler from processing the portion of the doorbells, write, based on detecting the potential deadlock, a subset of the doorbells to a doorbell overflow buffer on a host operatively connected to the HCA, and discard the subset without processing the subset before discarding.

In general, in one aspect, the invention relates to a system for processing commands that includes a host including a doorbell overflow buffer; and a host channel adapter. The host channel adapter includes a send queue scheduler buffer and a send queue scheduler. The send queue scheduler buffer is configured to store at least a portion of multiple doorbells corresponding to multiple commands. The send queue scheduler, is operatively connected to the send queue scheduler buffer, and is configured to receive, for the commands, the doorbells for writing to the send queue scheduler buffer, detect a potential deadlock of the send queue scheduler from processing the portion of the doorbells, write, based on detecting the potential deadlock, a subset of the doorbells to the doorbell overflow buffer, and discard the subset without processing the subset before discarding.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to avoid deadlock of the send queue scheduler executing on a host channel adapter (HCA) when processing doorbells. A doorbell is an indication to the send queue scheduler that a command is in a send queue waiting to be processed by the send queue scheduler. In one or more embodiments of the invention, a doorbell includes a queue pair identifier and a sequence number. Using the queue pair identifier and the sequence number, the send queue scheduler obtains and processes the corresponding commands. When a potential deadlock of the send queue scheduler is detected, embodiments of the invention write one or more doorbells back to the host and then discard these doorbells on the send queue scheduler. Thus, embodiments of the invention free resources of the send queue scheduler.

Figure 1:
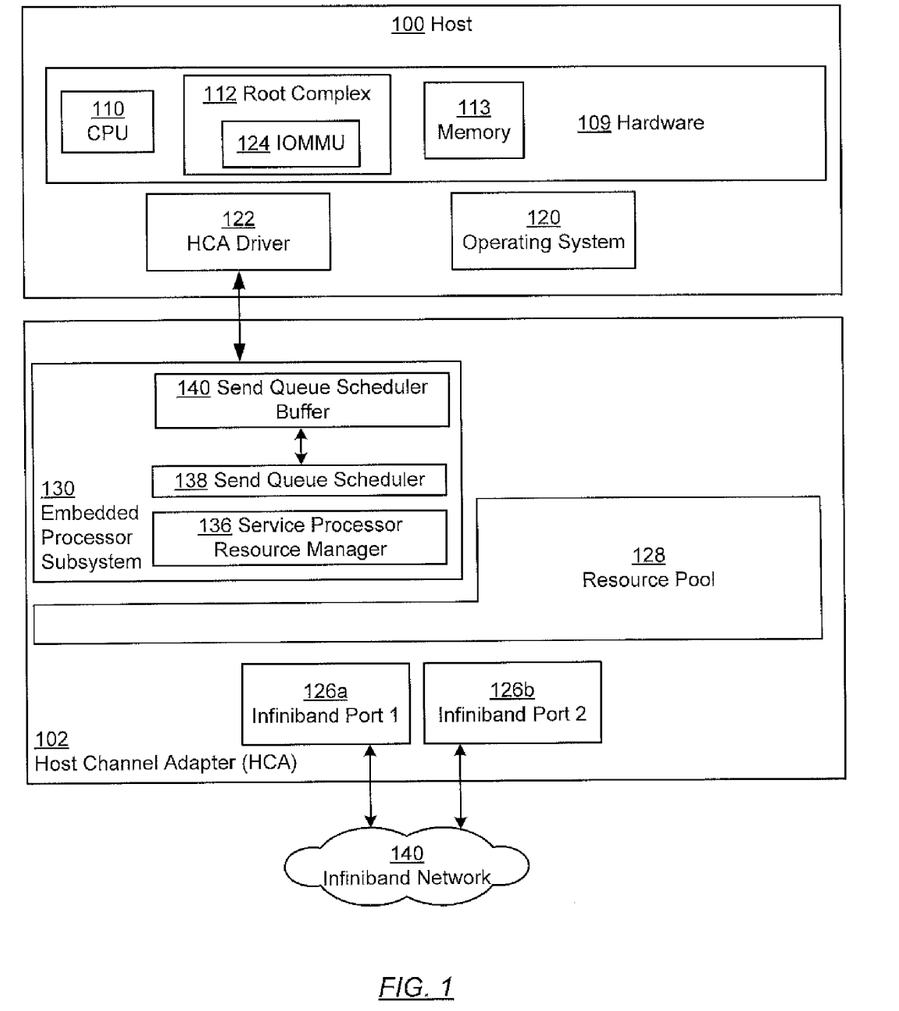
FIGS. 1-4 show schematic diagrams in one or more embodiments of the invention.

FIG. 1 shows a schematic diagram of a host system (100) in one or more embodiments of the invention. In one or more embodiments of the invention, the host system (100) is any physical computing device. Specifically, the host system (100) includes at least a minimum amount of hardware necessary to process instructions. As shown in FIG. 1, the host system (100) includes a host (100) and a host channel adapter (HCA) (102) in one or more embodiments of the invention. These components are discussed below.

In one or more embodiments of the invention, the host (100) includes an HCA driver (122) and operating system (120), and a root complex (112). In one or more embodiments of the invention, the HCA driver (122) is software that provides an interface to the HCA (102) for the operating system (120). Specifically, when the operating system wants to send commands to the HCA (102), the operating system (120) invokes a routine in the HCA driver (122).

Continuing with the host, the host (100) includes hardware (109). The hardware (109) may include, for example, a central processing unit (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores in one or more embodiments of the invention. In general, the CPU (110) is any device configured to execute instructions on the host (100).

In one or more embodiments of the invention, the memory (113) is any type of hardware device for storage of data. In one or more embodiments of the invention, the memory (113) may be partitioned. In one or more embodiments of the invention, the memory (113) includes functionality to store a send queue (not shown). In one or more embodiments of the invention, a send queue includes functionality to store an ordered list of command identifiers for commands for processing by the host channel adapter (102). In one or more embodiments of the invention, the command identifiers may be the actual commands and/or references to the commands stored in memory.

In one or more embodiments of the invention, the root complex (112) includes functionality to connect the CPU and memory subsystem to a peripheral component interconnect (PCI) Express switch fabric. Specifically, in one or more embodiments of the invention, the root complex (112) connects the host (100) to the host channel adapter (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) input/output (I/O) bus to the memory. In one or more embodiments of the invention, the IOMMU (124) includes functionality to translate addresses from one level of abstraction to another.

Continuing with FIG. 1, the host (100) is connected to the host channel adapter (102). In one or more embodiments of the invention, the connection between the host (100) and the host channel adapter (102) may be a PCI express connection. Specifically, the host channel adapter may connect to a PCI express fabric connector on the host.

In one or more embodiments of the invention, the host channel adapter (102) is a hardware device configured to connect the host (100) to the Infiniband® network (140). Specifically, the host channel adapter (102) includes functionality to receive commands from the host (100) and process the commands. Processing the commands may include performing DMA with host memory to obtain and store packet data and to obtain control information, performing any validation required on the packet data, generating packets from the packet data, and sending and receiving packets on the Infiniband® network (140). FIG. 1 shows a schematic diagram of the host channel adapter (102) from the prospective of the host (100). As shown in FIG. 1, the host channel adapter (102) includes at least one Infiniband® port (e.g., Infiniband® port 1 (126a), Infiniband® port 2 (126b)), a resource pool (128), and an embedded processor subsystem (130). Each of the components of the host channel adapter is discussed below.

In one or more embodiments of the invention, an Infiniband® port (e.g., Infiniband® port 1 (126a), Infiniband® port 2 (126b)) is a physical interface connector between the host channel adapter (102) and the Infiniband® network (140). Although FIG. 1 shows two Infiniband® ports, a different number of ports may exist without departing from the invention.

The resource pool (128) is a collection of resources that are required to send and receive packets on the Infiniband® network. Specifically, the resource pool (128) corresponds to the collection of hardware and stored data that is accessible by the host (100) and may be shared among virtual machines on the host (100). The resource pool (128) is discussed in FIG. 4 below.

The embedded processor subsystem includes a service processor resource manager (136), a send queue scheduler (138), and a send queue scheduler buffer (140). The service processor resource manager (136) includes functionality to receive and process the management commands on the host channels adapter. For example, the management commands may be to change the allocation of HCA resources, change the configuration of the HCA, and perform other management of the HCA. With respect to resource allocation, the service processor resource manager includes functionality to change the allocation of the HCA resources to underlying functions and change the allocation of the HCA resources to QoS levels within the underlying functions.

Continuing with FIG. 1, the send queue scheduler (138) includes functionality to schedule commands on the HCA identified in the send queue(s). Specifically, the send queue scheduler (138) includes functionality to iterate through a send queue scheduler buffer (140) and store commands identified in the send queue on the HCA (102). In one or more embodiments of the invention, the send queue scheduler buffer (140) may be in the embedded processor subsystem (130) or in a separate space of the HCA (102). The send queue scheduler buffer (140) corresponds to memory space on the HCA for storing doorbells. At any given time, the doorbells in the send queue scheduler buffer (140) are a subset of, or are completely distinct from, the doorbells in the doorbell overflow buffer on the host.

Figure 2:
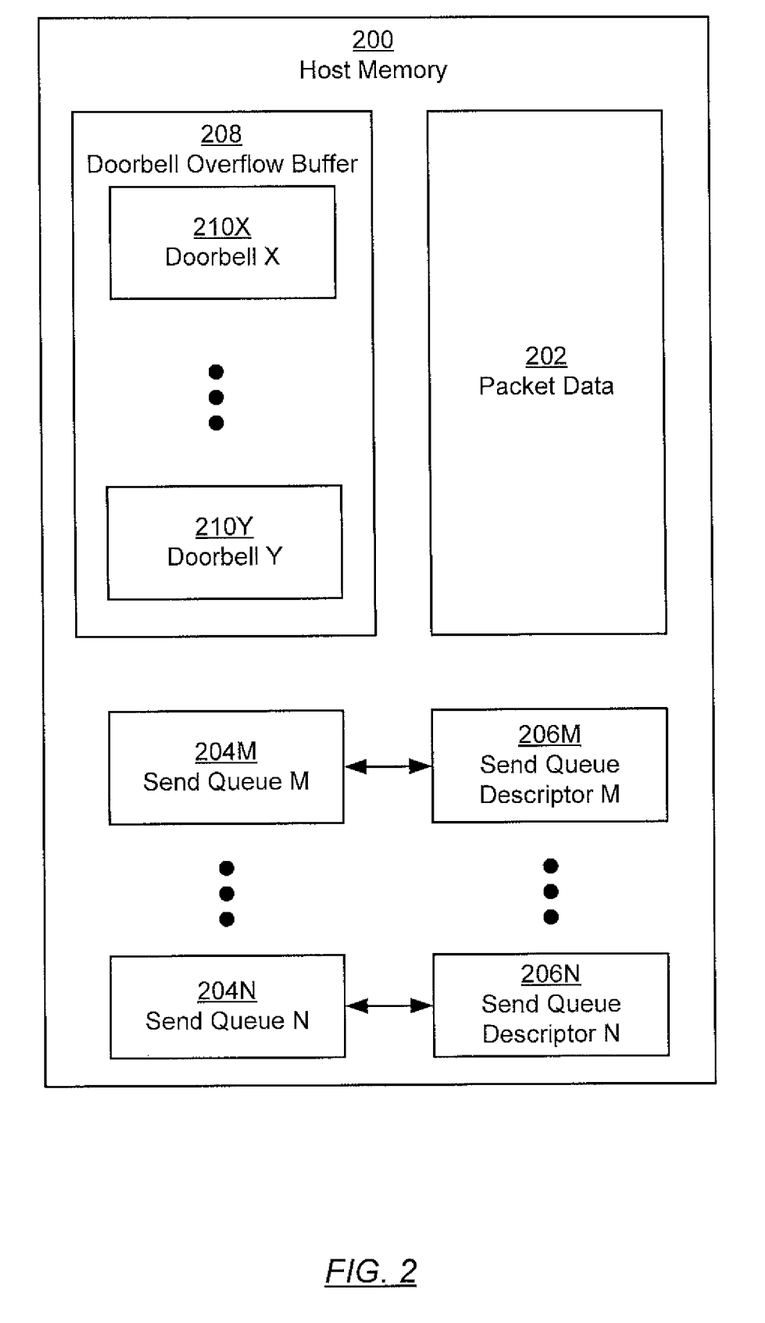

FIG. 2 shows a schematic diagram of host memory (200) in one or more embodiments of the invention. The host memory (200) may correspond to host memory (113) discussed above with reference to FIG. 1, the host memory (313) discussed below with reference to FIG. 3 or another host memory. As shown in FIG. 2, the host memory (200) includes packet data (202), one or more send queues (e.g., send queue M (204M), send queue N (204N)), one or more send queue descriptors (e.g., send queue descriptor M (206M), send queue descriptor N (206N)), and a doorbell overflow buffer (208). Each of these components is discussed below.

In general, a command is an instruction to the HCA to perform an action. For example, the command may be to issue an remote direct memory access (RDMA) write request, an RDMA read request, configure the Infiniband fabric, configure the HCA, send packets on the Infiniband network, and/or perform other actions. A command includes command data in one or more embodiments of the invention. Specifically, command data corresponds to individual portions of the command (e.g., operation identifier and zero or more parameter(s)). When the command is an instruction to send a message on the Infiniband® network, the parameters of the command may include the message itself or one or more addresses in the host memory having the message. Thus, the packet data for a particular command may be in the command or in the one or more locations specified by the address(es) in host memory.

In one or more embodiments of the invention, packet data (202) corresponds to data for transmission on the network. Specifically, packet data (202) corresponds to the body of the each packet being transmitted on the network. Although FIG. 2 shows the packet data as having a contiguous region of memory, the packet data (202) may be in non-contiguous regions of memory. Further, memory regions having the packet data (202) may be separated according to processes.

In one or more embodiments of the invention, a send queue (e.g., send queue M (204M), send queue N (204N)) corresponds to a queue for storing commands. In one or more embodiments of the invention, each command in the send queue has a corresponding sequence number. The sequence number creates and identifies the order in which the commands are issued for a queue pair. In other words, each subsequent command is assigned an increasing value as the sequence number. When the sequence number reaches a maximum value, the next subsequent command may be issued the minimum value without departing from the scope of the claims.

Further, in one or more embodiments of the invention, a separate send queue exists for each queue pair. Specifically, a process executing on the host that is assigned the queue pair may use the corresponding send queue to send commands to the HCA.

Each send queue is assigned a unique send queue identifier (not shown). Specifically, the unique send queue identifier uniquely identifies the send queue in host memory (200). The send queue identifier may be any form of identifier that uniquely identifies the send queue.

In one or more embodiments of the invention, each send queue has a corresponding send queue descriptor. In one or more embodiments of the invention, a single unique send queue descriptor may exist for each send queue. For example, as shown in FIG. 2, send queue descriptor M (206M) is assigned to send queue M (204M) and send queue descriptor N (206N) is assigned to send queue N (204N). The send queue descriptor stores information about the send queue. For example, the send queue descriptor may include the queue pair identifier for the send queue, a read pointer, and a write pointer for the send queue. The read pointer directly or indirectly references the command or work request being read while the write pointer directly or indirectly references the last memory block in the send queue being written.

Continuing with FIG. 2, the host memory (200) also includes a doorbell overflow buffer (208). A single doorbell overflow buffer (208) may exist for all processes and virtual machines (if applicable) in host memory (200). Alternatively, multiple doorbell overflow buffers may exist. In the alternative, each of the multiple doorbell overflow buffers may be associated with a distinct virtual machine and/or process.

In one or more embodiments of the invention, a doorbell overflow buffer (208) is a portion of memory that includes functionality to store doorbells (e.g., doorbell X (210X), doorbell Y (210Y)). Specifically, the doorbell overflow buffer (208) provides an overflow for storing doorbells from the send queue scheduler buffer (discussed above and below and in FIGS. 1 and 3). Each doorbell corresponds to information about a single command in one or more embodiments of the invention. Specifically, in one or more embodiments of the invention, a doorbell includes a queue pair identifier (discussed above) and a sequence number (discussed above) for the corresponding command. The queue pair identifier may be an identifier of the send queue (i.e., send queue identifier) or may be another identifier that uniquely identifies the queue pair and, subsequently, the send queue. In one or more embodiments of the invention, the only information in the doorbell is the queue pair identifier and the sequence number.

Figure 3:
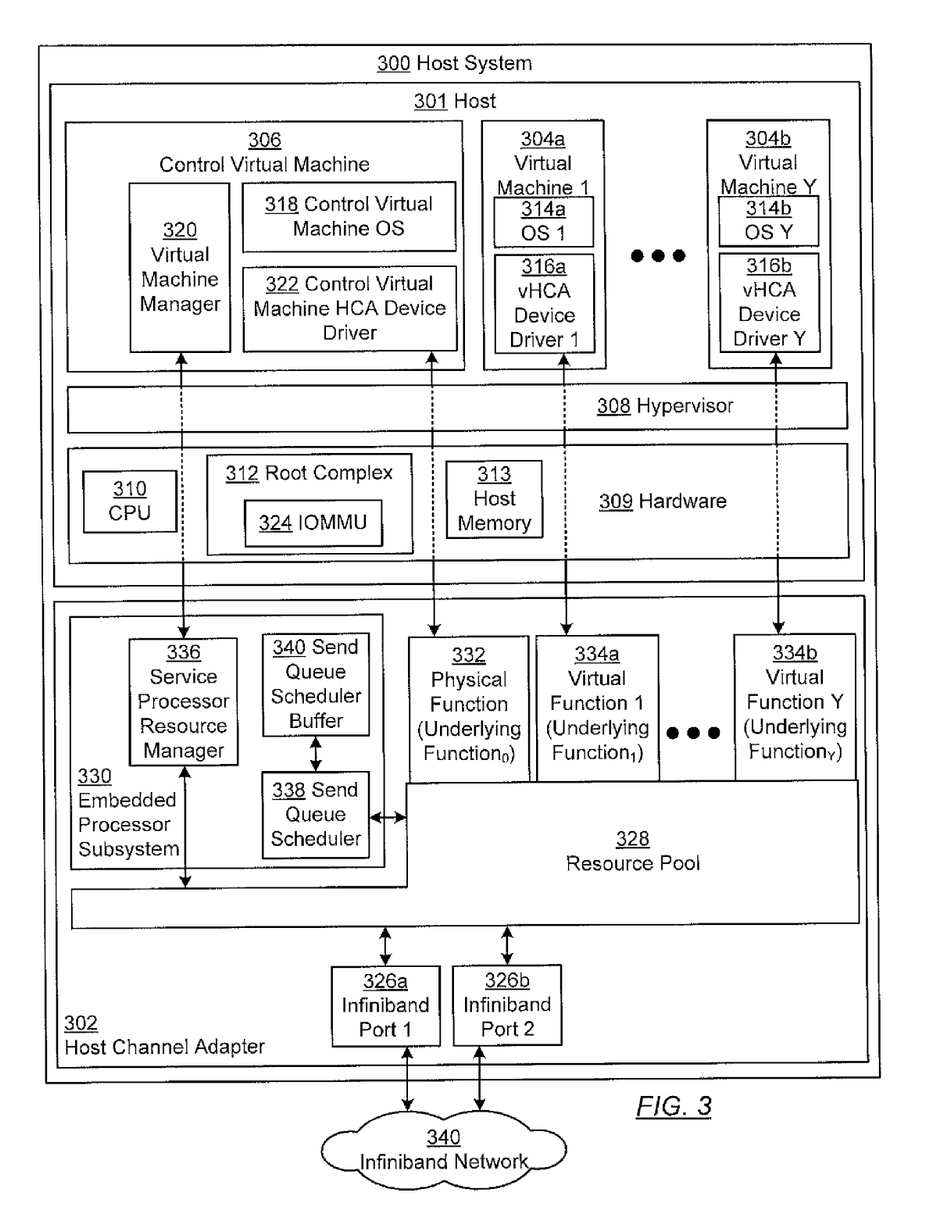

FIG. 3 shows a schematic diagram of a host system (300) when the host system includes virtualization in one or more embodiments of the invention. In one or more embodiments of the invention, the host system (300) is any physical computing device that has virtualized resources. The host system (300) includes at least a minimum amount of hardware necessary to process instructions. As shown in FIG. 3, the host system (300) includes a host (301) and a HCA (302) in one or more embodiments of the invention. These components are discussed below.

In one or more embodiments of the invention, the host (301) includes one or more guest virtual machines (e.g., virtual machine 1 (304a), virtual machine Y (304b)), a control virtual machine (306), a hypervisor (308), and hardware (309). Each of these components is discussed below.

Broadly speaking, the virtual machines (e.g., virtual machine 1 (304a), virtual machine Y (304b), control virtual machine (306)) are distinct operating environments configured to inherit underlying functionality of the host operating system via an abstraction layer. In one or more embodiments of the invention, each virtual machine includes a separate instance of an operating system (e.g., OS 1 (314a), OS Y (314b), Control Virtual Machine Operating System (318)) (OS in FIG. 3). The separate instances of the operating system may be the same type of operating system or different types of operating systems.

Specifically, the guest virtual machine operating system (e.g., OS 1 (314a), OS Y (314b)) operates as if the guest virtual machine operating system is the only operating system on the host (301) and the resources (e.g., processor cycles, memory, resources of the HCA) allocated to the guest virtual machine are the only resources available on the host (301). Thus, the guest virtual machine operating system (e.g., OS 1 (314a), OS Y (314b)) includes functionality to control the operating environment of applications executing in the guest virtual machine using resource allocated to the guest virtual machine. Each virtual machine may be allocated disjoint or non-overlapping physical memory (313).

Many different types of virtual machines exist. For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). Another example is a Solaris™ Container. In such cases, the Solaris™ Container may execute in the host operating system, which may be a Solaris™ operating system. Solaris™ is a trademark of Oracle America, Inc. In one embodiment of the invention, the host operating system may include both virtual machines and virtual execution environments.

In one or more embodiments of the invention, the guest virtual machine includes a virtual HCA device driver (e.g., vHCA driver 1 (316a), vHCA driver Y (316b)). The virtual HCA device driver is software program that provides an interface to HCA (302) for the guest virtual machine operating system. Specifically, when the guest virtual machine operating system wants to send commands to the HCA (302), the virtual machine operating system invokes a routine in the virtual HCA device driver. In response, the virtual HCA device driver issues commands to a virtualized device controller (not shown) presented by the hypervisor (308) (discussed below). In turn, the hypervisor (308) includes functionality to transmit the message to the HCA (302).

In addition to the guest virtual machine (e.g., virtual machine 1 (304a), virtual machine Y (304b)), the host (301) also includes a control virtual machine (306). In one or more embodiments of the invention, the control virtual machine (306) has a separate address space and operating system environment than the guest virtual machine (e.g., virtual machine 1 (304a), virtual machine Y (304b)). The control virtual machine (306) includes a control virtual machine operating system (318), a control virtual machine manager (320), and a virtual machine HCA device driver (322). The virtual machine HCA device driver (322) includes functionality similar to the guest virtual machine HCA device drivers (e.g., vHCA driver 1 (316a), vHCA driver Y (316b)) discussed above. The host virtual machine operating system (318) includes functionality to provide an operating environment for software executing in the control virtual machine (306).

In one or more embodiments of the invention, the software executing in the control virtual machine (306) includes a virtual machine manager (320) (discussed below). In one or more embodiments of the invention, the virtual machine manager (320) includes functionality to configure the hypervisor (308), configure the HCA (302), create, remove, and configure guest virtual machines, and perform the management of the host (301). With respect to configuring the HCA, the virtual machine manager includes functionality to send commands to the HCA to adjust the number of resources allocated to each virtual machine. To receive parameter values for performing the above management tasks, the virtual machine manager (320) may include a user interface and/or an application programming interface for communicating with a computer administrator or another program in one or more embodiments of the invention.

Continuing with FIG. 3, the hypervisor (308) includes functionality to control the sharing of hardware resources on the host (301). Specifically, the hypervisor (308) includes functionality to virtualize the physical devices of the host (301) so that more than one operating system may share the same physical device transparently in accordance with one or more embodiments of the invention. Further, the hypervisor (308) controls when the guest virtual machine (e.g., virtual machine 1 (304a), virtual machine Y (304b)) and the control virtual machine (306) are allowed to execute. For example, the hypervisor (308) may be a thin-privileged layer of software that only manages which guest virtual machine or the host virtual machine (306) is executing.

Continuing with the host, the host (301) includes hardware (309), which may include, for example, a central processing unit (310), memory (313), and a root complex (312). The root complex (312) may include an IOMMU (324). The hardware (309), and included components, may be the same as, substantially the same as, or similar to the hardware (109) in FIG. 1, and, thus, the corresponding descriptions from FIG. 1 are incorporated herein. Further, with virtualization, the memory (313) may include a separate send queue for each virtual machine. Alternatively or additionally, multiple virtual machines may share one or more send queues.

Continuing with FIG. 3, the host (301) is connected to the HCA (302). As shown in FIG. 3, the HCA (302) includes at least one Infiniband® port (e.g., Infiniband® port 1 (326a), Infiniband® port 2 (326b)), a resource pool (328), and an embedded processor subsystem (330). The connection between the host (301) and the HCA (302), the HCA (302), the Infiniband® port(s), resource pool (328), and an embedded processor subsystem (330) may be the same as, substantially the same as, or similar to the corresponding like named components discussed above with reference to FIG. 1, and, thus, the corresponding descriptions from FIG. 1 are incorporated herein.

In one or more embodiments of the invention, the sharing of the resource pool is performed using the concepts of physical function and virtual functions. A physical function (332) exposes the actual hardware of the HCA (302) to an operating system. Specifically, by way of the physical function, the control virtual machine operating system (318) may control the HCA. Thus, the physical function allows the control virtual machine (306) to control the HCA (302), such as to disable the HCA (302).

A virtual function (e.g., virtual function 1 (334a), virtual function Y (334b)) exposes a virtualized HCA to a virtual machine. Specifically, the virtual function (e.g., virtual function 1 (334a), virtual function Y (334b)) exposes to the virtual machine operating system only the partition of the resource pool allocated to the virtual machine To the guest virtual machine (e.g., virtual machine 1 (304a), virtual machine Y (304b)), the resources exposed by the virtual function (e.g., virtual function 1 (334a), virtual function Y (334b)) appear as if the resource are the only resources on the HCA (302). Thus, the virtual function (e.g., virtual function 1 (334a), virtual function Y (334b)) allows the virtual machine operating system (e.g., OS 1 (314a), OS Y (314b)) to control the portion of resources allocated to the virtual machine. In other words, a virtual function (e.g., virtual function 1 (334a), virtual function Y (334b)) provides the virtual machine operating system (e.g., OS 1 (314a), OS Y (314b)) the appearance that the virtual machine operating system (e.g., OS 1 (314a), OS Y (314b)) is controlling the HCA (302) as a whole even though the actions of the virtual machine operating system (e.g., OS 1 (314a), OS Y (314b)) does not affect any other virtual function (e.g., virtual function 1 (334a), virtual function Y (334b)).

In one or more embodiments of the invention, the term, underlying function (UF), is used to generically refer to either a physical function or a virtual function. Specifically, as used herein, an underlying function may be a physical function or a virtual function.

The embedded processor subsystem (330) corresponds to an embedded processor and logic for managing the HCA (302). The embedded processor subsystem (330) includes a service processor resource manager (336), a send queue scheduler (338), and a send queue scheduler buffer (340). The embedded processor subsystem (330), service processor resource manager (336), send queue scheduler (338), and send queue scheduler buffer (340) may be the same as, substantially the same as, or similar to the corresponding like named components discussed above with reference to FIG. 1, and, thus, the corresponding descriptions from FIG. 1 are incorporated herein.

Figure 4:
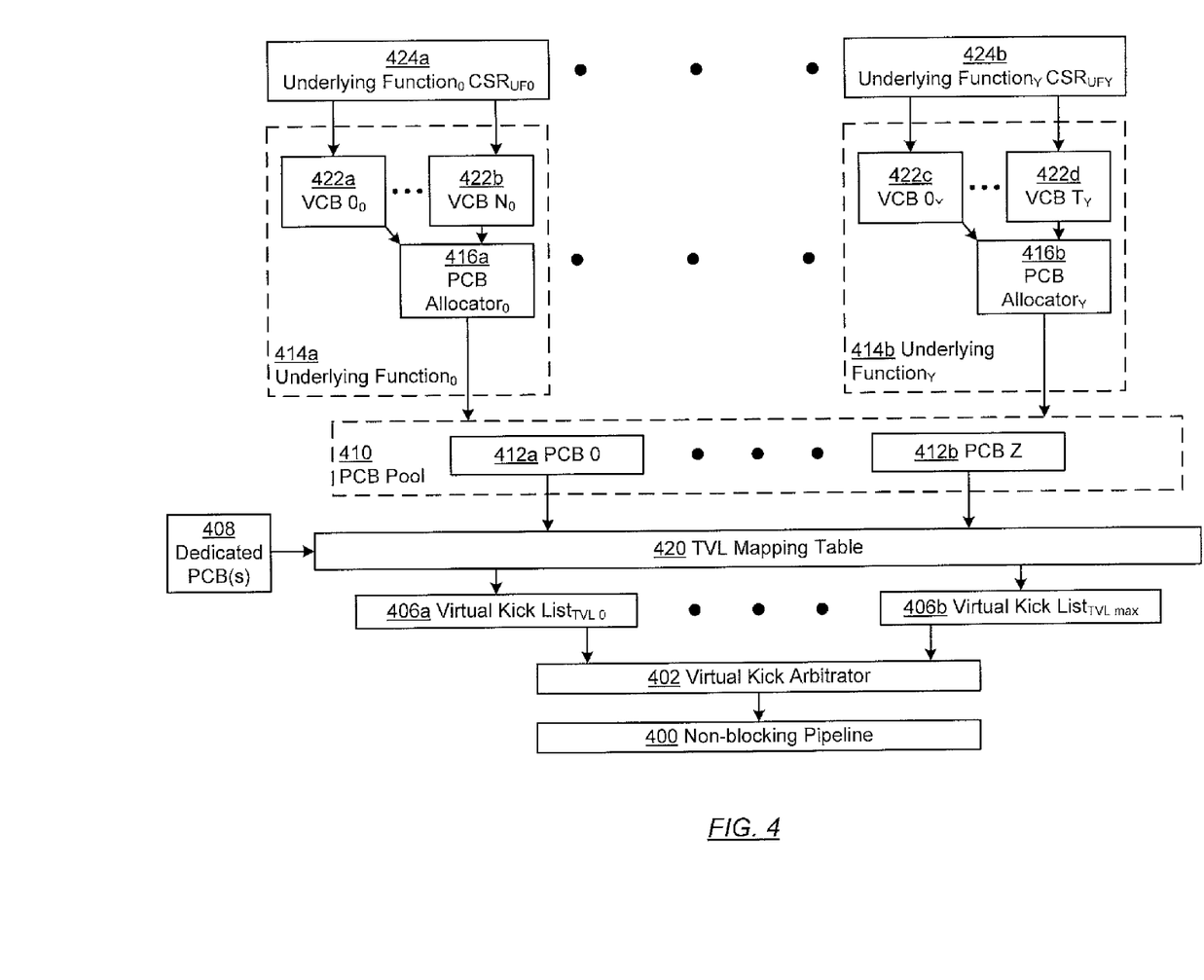

As discussed above, FIG. 3 provides a general diagram of the HCA (302) in one or more embodiments of the invention. FIG. 4 shows a schematic diagram of the resources and management components for the resources of the HCA in one or more embodiments of the invention. Specifically, FIG. 4 shows components of the resource pool for transmission of messages on the Infiniband® network as shared between virtual machines and components to manage the resource pool in one or more embodiments of the invention.

In general, the resource pool is configured to receive and execute commands from a virtual machine. The HCA is configured to obtain the command and perform the operation specified in the command. For example, if the command is to send a message, the HCA includes functionality to obtain the message from the command or from host memory referenced in the command, partition the message into packets when required, and send the packets on the Infiniband® network in accordance with an Infiniband® protocol.

As shown in FIG. 4, the resource pool and management components of the HCA include a pipeline (400), a virtual kick arbitrator (402), transmit virtual lane (TVL) virtual kick lists (e.g., virtual kick list$_{TVL0}$ (406a), virtual kick list$_{TVLmax}$ (406b)), a mapping table (420), physical collect buffer (PCB) pool (410), dedicated PCBs (408), a PCB allocator (e.g., PCB Allocator$_0$(416a), PCB Allocator$_Y$(416b)), virtual collect buffers (VCBs) (e.g., VCB $0_0$ (422a), VCB N$_0$ (422b), VCB $0_Y$ (422c), VCB T$_Y$ (422d)), and underlying function CSRs (e.g., underlying function$_0$ CSR$_{UF0}$ (424a), underlying function$_Y$ CSR$_{UFY}$(424b)). Each of these components is discussed below.

The pipeline (400) corresponds to a set of hardware and firmware that includes functionality to process commands on the HCA. In one or more embodiments of the invention, the pipeline is a non-blocking pipeline, thereby allowing commands in different queue pairs to pass each other. Specifically, the pipeline (400) includes functionality to obtain a command from a PCB (described below), obtain packet data based on the command data, verify the queue pair for sending the packet data, generate one or more packets having the packet data, and sending the packets on the Infiniband® network in accordance with the Infiniband® protocol. In one or more embodiments of the invention, the pipeline (400) is partitioned into modules (not shown). Each module corresponds to hardware and/or firmware that includes functionality to perform a portion of the pipeline. For example, one module may be configured to perform DMA with the host memory while another module may be configured to generate packets having the packet data.

In one or more embodiments of the invention, one of the modules includes a completion module. A completion module includes functionality to store messages in a completion linked list queue until an acknowledgement is received or transmission is deemed to have failed, such as by not receiving an acknowledgement within a predefined period of time. In one or more embodiments of the invention, the completion module is used when a queue pair is set in reliable transmission mode.

In one or more embodiments of the invention, the pipeline is time shared amongst TVLs. In particular, a TVL is a time slice of the pipeline. In other words, commands assigned to a TVL may be blocked by the execution through the pipeline of one or more other commands in the same TVL. In contrast to commands assigned to the same TVL, when a command is assigned to a different TVL, the command is not blocked by other commands in different TVLs.

In one or more embodiments of the invention, each TVL is associated with a virtual kick list (e.g., virtual kick list$_{TVL\ 0}$ (406a), virtual kick list$_{TVL\ max}$ (406b)). A virtual kick list (e.g., virtual kick list$_{TVL\ 0}$ (406a), virtual kick list$_{TVL\ max}$ (406b)) corresponds to a storage location for storing command identifiers of commands, assigned to the TVL, for which a kick has issued. A kick indicates that the command is ready for execution on the pipeline (400). Specifically, in one or more embodiments of the invention, the kick indicates that the entirety of the command is stored on the HCA. In one or more embodiments of the invention, commands are processed from the virtual kick list in a first in first out (FIFO) order. In other words, the commands are processed in an order in which the commands are received.

In one or more embodiments of the invention, the command identifier of the command may be the command, an address of a memory location having the command, or any other data that identifies the command. For example, the command identifier may be an address or identifier of the PCB (discussed below) having the command.

In one or more embodiments of the invention, a virtual kick arbitrator (402) is operatively interposed between the virtual kick list (e.g., virtual kick list$_{TVL0}$ (406a), virtual kick list$_{TVLmax}$ (406b)) and the pipeline (400). In one or more embodiments of the invention, the virtual kick arbitrator includes functionality to arbitrate between TVLs having commands initiating execution on the pipeline. Specifically, the virtual kick arbitrator includes functionality to select a TVL and initiate execution of the command from the virtual kick list for the TVL.

Continuing with FIG. 4, the HCA includes PCBs (e.g., dedicated PCBs (408), PCB 0 (412a), PCB Z (412b)). A PCB is physical memory that is configured to store a single command. Further, each command requires a single PCB in one or more embodiments of the invention.

Dedicated PCBs correspond to PCBs that are dedicated for use by administrator and management components in one or more embodiments of the invention. For example, dedicated PCBs may be used by the service processor resource manager, the send queue scheduler, a host process for controlling the HCA, and for other such components of the system.

In one or more embodiments of the invention, the HCA includes a PCB pool (410). A PCB pool (410) corresponds to a collection of PCBs (e.g., PCB 0 (412a), PCB Z (412b)) that are available for use by any underlying function. Specifically, each PCB (e.g., PCB 0 (412a), PCB Z (412b)) in the PCB pool (410) may used by any underlying function in one or more embodiments of the invention. When a PCB is in use by an underlying function (e.g., Underlying Function$_0$ (414a), Underlying Function$_Y$ (414b)) to store a command, the PCB is considered bound to the underlying function and cannot be used by another underlying function.

Continuing with FIG. 4, a TVL mapping table is operatively interposed between the PCBs (e.g., dedicated PCBs (408), PCB 0 (412a), PCB Z (412b)) and the virtual kick list (e.g., virtual kick list$_{TVL0}$ (406a), virtual kick list$_{TVLmax}$ (406b)) in one or more embodiments of the invention. The TVL mapping table (420) includes a mapping of the underlying function (e.g., Underlying Function$_0$ (414a), Underlying Function$_Y$ (414b)) to one or more TVLs. In particular, the mapping defines, for each underlying function, which TVLs correspond to the underlying function. Specifically, each underlying function may be allocated a set of TVLs. In one or more embodiments of the invention, the mapping of set of TVLs may be storage of an identifier of the underlying function with an identifier of the virtual kick lists corresponding to the TVLs in the set of TVLs.

Additionally, in one or more embodiments of the invention, a set of TVLs may be allocated to the dedicated PCBs (408). Thus, the TVL mapping table (420) may further include a mapping of the dedicated PCBs to the set of TVLs allocated to the dedicated PCBs.

Continuing with FIG. 4, the PCB pool (410) is connected to one or more PCB allocators. A PCB allocator is logic, such as hardware or firmware, configured to select the PCB from the PCB pool (410) for storing a command. Although FIG. 4 shows multiple PCB allocators, a single PCB allocator may exist for all underlying functions. Alternatively or additionally, a separate PCB allocator may exist for each PCB.

In one or more embodiments of the invention, the PCB allocator further includes functionality to bind the PCB to a VCB (VCB) (e.g., VCB $0_0$ (422a), VCB $N_0$ (422b), VCB $0_Y$ (422c), VCB $T_Y$(422d)). In one or more embodiments of the invention, a VCB is a virtual address space used by a process on the host to write to a PCB, if available. In one or more embodiments of the invention, if a PCB is available, the VCB is bound to the PCB and the work request is executed. If the PCB is not available, the work request in the VCB is turned into an implicit doorbell ring. In one or more embodiments of the invention, a single VCB is capable of being bound to only a single PCB at any single moment in time in one or more embodiments of the invention. Thus, the binding a PCB to a VCB creates an association between the VCB and the PCB. In other words, the binding prevents the PCB from being used by any other VCB and prevents the VCB from being associated with any other PCB.

In one or more embodiments of the invention, an underlying function CSR (e.g., $CSR_{UF0}$ (424a), $CSR_{UFY}$ (424b)) stores status and control information about the VCBs allocated to the underlying function. Specifically, each underlying function is allocated a set of VCBs from a VCB pool (discussed below and in FIG. 3). The number of VCBs allocated to an underlying function represents a guarantee of the number of commands that the HCA will process for the virtual machine corresponding to the underlying function. In one or more embodiments of the invention, the number of VCBs allocated to an underlying function may exceed the number of PCBs allocated to the underlying function.

Continuing with FIG. 4, in one or more embodiments of the invention, the underlying function CSR (e.g., $CSR_{UF\ 0}$ (424a), $CSR_{UF\ Y}$(424b)) may include a base address register (BAR). The BAR stores the lowest virtual address assigned to the underlying function in one or more embodiments of the invention. The underlying function CSR may further store information about which VCBs are in use in one or more embodiments of the invention. Specifically, each underlying function may be allocated a set of VCBs. The number of VCBs allocated to each underlying function may or may not be the same as the number of VCBs allocated to different underlying functions. The underlying function BAR stores the address of the first VCB allocated to the underlying function in one or more embodiments of the invention.

A similar system to FIG. 4 may exist for a non-virtualized host. In such a scenario, the underlying functions may correspond to individual applications or a set of applications executing on the host.

Figure 5:
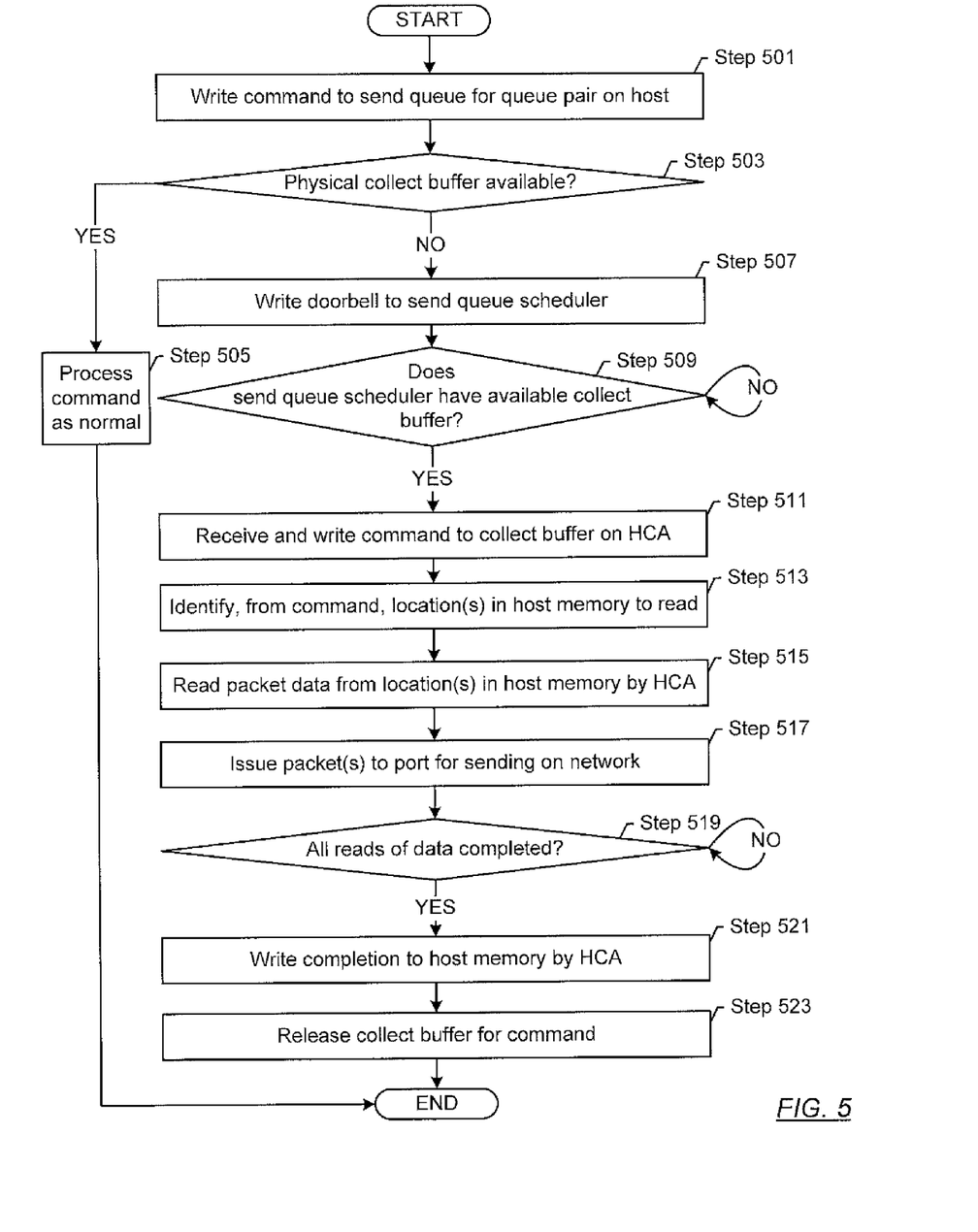
FIGS. 5-7 show flowcharts in one or more embodiments of the invention.
Figure 6:
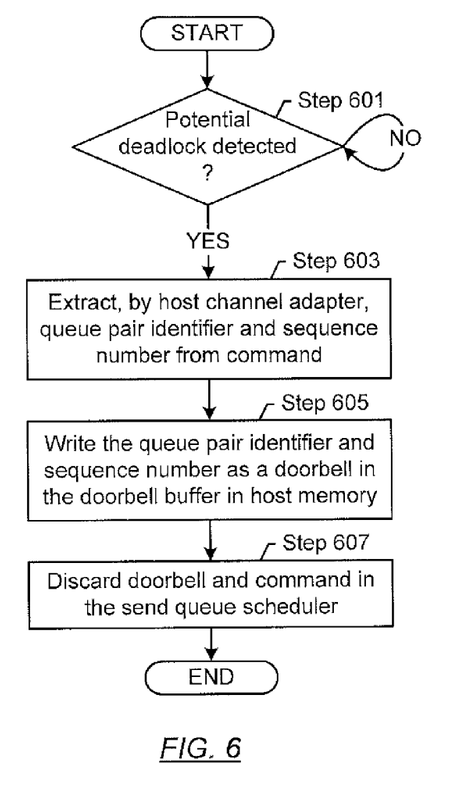
Figure 7:
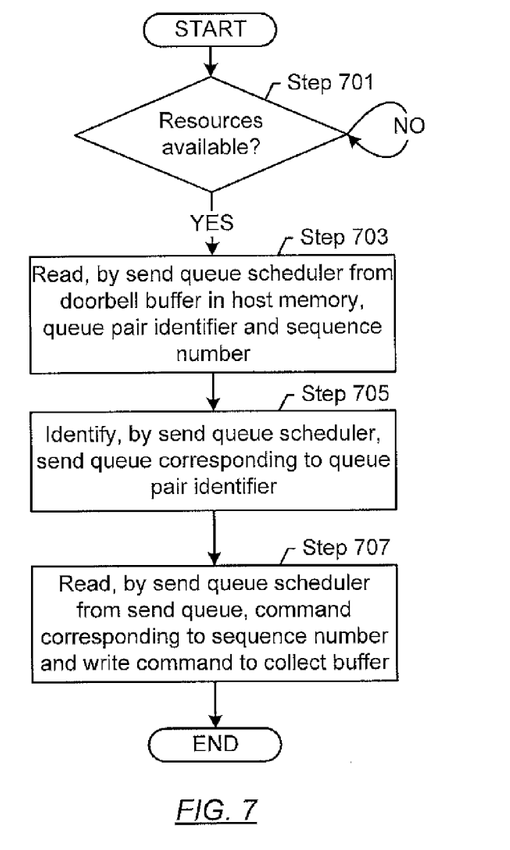

FIGS. 5-7 show flowcharts in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 5 shows a flowchart for sending commands in one or more embodiments of the invention. In Step 501, a command is written to the send queue on the host. Specifically, when a process issues the command for a particular queue pair, the process writes the command to the send queue corresponding to the queue pair. The process may further update the send queue descriptor to indicate the next block of the send queue for writing a command. The process of writing the command to the send queue and updating the send queue descriptor may include acquiring a lock for both the send queue and send queue descriptor.

In one or more embodiments of the invention, as well as writing the command to the send queue, the command is written to a virtual collect buffer. Specifically, the process writes the command to the HCA using an address of a virtual collect buffer. In one or more embodiments of the invention, management of the usage of the VCBs is performed by an operating system in one or more embodiments of the invention. Specifically, the operating system allocates the VCBs to the process requesting the VCB. The process selects the VCB to allocate from the set of VCBs allocated to the process. If a VCB is not available, then the VCB write may be turned into a write of a doorbell as discussed below. When a VCB is available, the process sends the command to the requested address. At this stage, once the command is sent to the VCB, to the process, the command is processed by the HCA. However, the physical resources may not be available on the HCA.

In Step 503, a determination is made whether a PCB is available for writing the command. Specifically, when command data corresponding to a new command is received, the PCB allocator determines, based on the virtual function, whether a PCB is available. For example, the PCB allocator may first check whether a PCB corresponding to the underlying function is available. If a PCB corresponding to the underlying function is not available, then the PCB allocator may check whether a PCB shared amongst the underlying functions is available. Checking whether a PCB is available may be performed by checking a CSR to determine whether the maximum allocated number of PCBs is in use.

If a PCB is available for writing the command, then the command is processed as normal in Step 505. Specifically, a free PCB is allocated to the command and the command is written to the PCB. Allocating the free PCB may include locking the free PCB, such that the PCB cannot be used for another command until the command is processed through the pipeline and the PCB is freed. Processing the command as normal is discussed in U.S. patent application Ser. No. 12/149,436, which is incorporated herein by reference.

Alternatively, if a PCB is not available, then a doorbell is written to the send queue scheduler in Step 507. In particular, the queue pair identifier and the send queue sequence number are extracted from the command data and the remaining command data for the command is dropped. The send queue identifier may be extracted directly from the command or indirectly from the command. For example, the command may specify the queue pair identifier. If the queue pair identifier is the same as the send queue identifier, then the send queue identifier is identified from the command. As another example, the send queue identifier, which is different from the queue pair identifier, may be a part of the command data. As another example, the queue pair identifier may be used as an index into a table or other data structure that relates queue pair identifiers with send queue identifiers.

Writing the doorbell may include writing the queue pair identifier and sequence number as the doorbell to the send queue scheduler buffer. In one or more embodiments of the invention, when the send queue scheduler buffer is full, backpressure exists and the doorbell cannot be written. In other words, the send queue scheduler buffer may be one of the resources that may cause deadlock. Thus, the send queue scheduler buffer is monitored by the send queue scheduler to determine whether a threshold number of entries is available for writing doorbells. By performing the monitoring, in one or more embodiments of the invention, when a doorbell is to be written to the send queue scheduler buffer, an entry in the send queue scheduler buffer is available.

Further, as discussed above, the non-existence of a PCB may be hidden from the process. Accordingly, the process of the virtual machine may send command data for the entire command to the HCA. However, as discussed above, the remaining command data is dropped in one or more embodiments of the invention.

Although not shown in FIG. 5, rather than a process on the host initiating the writing of a command to the HCA, the process on the host may write a doorbell to the HCA. For example, the process may write to a register on the HCA associated with a QP or writes a QP number (and sequence number) to a location on the HCA, such as the send queue scheduler buffer.

The send queue scheduler processes doorbells from the send queue scheduler buffer. In one or more embodiments of the invention, the send queue scheduler iterates through the send queue scheduler buffer when processing doorbells. Thus, the doorbell written in Step 507 may wait in the send queue scheduler buffer until it is the next doorbell to be processed.

In one or more embodiments of the invention, processing a doorbell includes adding the send queue corresponding to the doorbell to a linked list of send queues corresponding to doorbells. The linked list is created using a send queue pointer in a send queue descriptor, corresponding to one send queue that references another send queue descriptor. In one or more embodiments of the invention, the send queue scheduler creates the linked list as follows. When the first doorbell arrives, the send queue scheduler identifies a first send queue descriptor of the send queue referenced in the first doorbell and stores a pointer to the first send queue descriptor. When the second doorbell is received, the send queue scheduler identifies the second send queue descriptor of the send queue referenced in the second doorbell and updates the send queue pointer in the first send queue descriptor to reference the second send queue descriptor. When the third doorbell is received, the send queue scheduler identifies the third send queue descriptor of the send queue referenced in the third doorbell and updates the send queue pointer in the second send queue descriptor to reference the third send queue descriptor. This process repeats for each such that when a new doorbell (i.e., last doorbell) is received, the send queue scheduler identifies the last send queue descriptor of the send queue referenced in the last doorbell and updates the send queue pointer in the second to last send queue descriptor to reference the last send queue descriptor.

Prior to adding the doorbell, the Send Queue Scheduler checks whether the queue pair (or its Send Queue) is inserted into the linked list for queue pair that has work to do and requires the send queue scheduler to read work requests from their Send Queues and write the work requests to a dedicated collect buffer. To check whether a queue pair is already inserted, a read or an atomic compare-and-swap is issued on the PCIe bus. A read or an atomics compare-and-swap is a request sent on PCIe which requires a completion on the PCIe bus.

To identify the send queue when processing a doorbell, the send queue scheduler obtains the queue pair identifier and sequence number from the doorbell in the send queue scheduler buffer. Alternatively, the host channel adapter may associate the queue pair with the doorbell. In such a scenario, the send queue scheduler obtains the queue pair identifier based on the association. The send queue scheduler may issue a read request to the host memory to read the send queue descriptor for the send queue corresponding to the queue pair identifier. The send queue scheduler may issue a write request to update the prior send queue descriptor to reference the next send queue descriptor in the linked list. Once information from the doorbell is added to the linked list, the doorbell is discarded and the buffer space for the doorbell is made available.

As discussed above, order to check if the QP is already inserted, the send queue scheduler issues a read or an atomic compare-and-swap is issued on the PCIe bus, which requires a completion on the PCIe bus. Since the write of the write request to the virtual collect buffer or the write to the doorbell uses same resources on PCIe as the completion returned from the read/atomic in the bullet above, deadlock might occur. In order to break the dependency, the HCA will, in cases which is determined to be deadlock prune, write the QP number (and sequence number) to the doorbell overflow buffer in main memory. In certain system configurations or peripheral busses used, the HCA can issue a posted write when observing an implicit or an explicit doorbell without causing deadlocks.

While the send queue scheduler is processing doorbells, the send queue scheduler may also process commands from the linked list. Specifically, in Step 509, a determination is made whether the send queue scheduler has an available physical collect buffer. The send queue scheduler may be determined to have an available physical collect buffer when a dedicated collect buffer of the send queue scheduler exists that is not locked or allocated to another command. When the send queue scheduler does not have an available collect buffer, then send queue scheduler waits until a collect buffer is available.

In Step 511, when the send queue scheduler has an available collect buffer, the command data is received and written to the collect buffer on the HCA in one or more embodiments of the invention. Prior to writing the command to the collect buffer, the collect buffer is locked, such that only the command can be written to it. In other words, the collect buffer is allocated only to the command until the command is processed through the pipeline and the collect buffer is freed. In one or more embodiments of the invention, when issuing the read request, the send queue scheduler may also issue a write to the send queue descriptor to update the send queue descriptor to indicate that a command is processed. In response to the read request, command data is transmitted to the HCA and written the PCB until the kick is received. Specifically, in one or more embodiments of the invention, the command data may be transmitted to the HCA using the PCI express fabric. Each command may be of variable length. The kick indicates that the entirety of the command is stored in the PCB.

At this stage, although not shown in FIG. 5, the virtual kick arbitrator may select which TVL to enter the pipeline. The virtual kick arbitrator may select the TVL in accordance with a load balancing protocol. For example, the load balancing protocol may be round robin, weighted round robin, etc.

In Step 513, location(s) in host memory to read are identified from the command in one or more embodiments of the invention. Specifically, the command data may specify a location in host memory, such as the location of packet data. If the command data specifies a location in host memory, then DMA is performed to obtain the packet data. A DMA module on the HCA may identify one or more locations in host memory that are specified in the command data in the PCB.

In Step 515, packet data is read from the identified memory locations by the HCA in one or more embodiments of the invention. Specifically, the DMA module obtains the packet data from the one or more locations in host memory and stores the packet data into buffers. In one or more embodiments of the invention, as part of obtaining the packet data, the DMA may perform validation to ensure that the host process sending the command has necessary permissions to obtain the packet data.

In Step 517, regardless of whether the DMA is required, the packets are issued to the port for sending on a network in one or more embodiments of the invention. In particular, packets are generated from the packet data. The generating of the packets may include performing various levels of identification and validation, such as validating the send queue sending the packet(s) and the receive queue receiving the packet(s).

In Step 519, a determination is made as to whether all reads of data are completed. If not all reads of data are completed, then the other commands may be processed until the reads are completed in one or more embodiments of the invention (not shown). In one or more embodiments of the invention, writes are strongly ordered after reads of data. Thus, if a read remains for reading packet data, then the send queue scheduler waits and the command remains in the collect buffer.

In Step 521, if all reads are completed, then a completion is written to host memory in one or more embodiments of the invention. Specifically, the completion is written to the completion queue corresponding to the queue pair. The completion indicates to the process that the initiated the command that the processing of the command completed.

In Step 523, the physical collect buffer for the command is released in one or more embodiments of the invention. Specifically, the release of the physical collect buffer allows additional doorbells to the processed in one or more embodiments of the invention.

In one or more embodiments of the invention, as discussed above, a completion may not be written to the completion queue until all reads for other commands are completed. The strong ordering may cause deadlock when a collect buffer is not available. Specifically, consider the scenario where a read has a completion response coming back from the device, the completion response may be stuck behind another write, which cannot be written because the device is in the process of a previous write. However, because of the strong ordering, the previous write cannot occur until the read response comes back with the read data.

FIG. 6 shows a flowchart for avoiding deadlock in one or more embodiments of the invention. In Step 601, a determination is made about whether a potential deadlock is detected. In one or more embodiments of the invention, a potential deadlock is detected when few resources are available. For example, a potential deadlock may be detected when less than a threshold number of entries for writing doorbells in the send queue scheduler buffer is available and/or when less than a threshold number of dedicated collect buffers is available. The threshold number of entries may be the same value or a different value than the threshold number of dedicated collect buffers. Further, the threshold numbers may be configured on the HCA. The configuration of the threshold number(s) may be adaptive and performed by the HCA. Alternatively or additionally, the configuration of the threshold number(s) may be performed by a process on the host.

When a potential deadlock is not detected, the send queue scheduler may continue processing doorbells as normal and the existence of potential deadlocks may continue to be monitored.

When a potential deadlock is detected, then the HCA extracts the queue pair identifier and sequence number from the command in Step 603. Specifically, for each new command received after deadlock is detected, the HCA obtains the queue pair identifier and sequence number.

In Step 605, the queue pair identifier and sequence number are written as a doorbell to the doorbell overflow buffer in host memory in one or more embodiments of the invention. Specifically, rather than or in addition to writing the doorbell to the send queue scheduler buffer, the doorbell is written back to host memory.

In Step 607, the doorbell and command are discarded by the send queue scheduler. Specifically, any entry having the doorbell in the send queue scheduler buffer is marked as available. Similarly, the doorbell and command is ignored. In other words, the send queue scheduler does not process the doorbell or any command that the send queue scheduler received at this stage. Rather, the doorbell is only processed from the doorbell overflow buffer when the send queue scheduler starts processing doorbells as discussed below and in FIG. 7.

As discussed above with respect to FIG. 6, the process on the host may initiate a write of the doorbell rather than the command to the HCA. In such a scenario, the steps of FIG. 6 may be performed to write the doorbell back to host memory once the doorbell is received. The processing of the command and the doorbell requires at least two communications on the bus between the HCA and the host. The first communication is to write the command or doorbell to the HCA from the host. The second communication is to write the doorbell back to host memory on the host. However, the two communications prevent the software from having to either manage the potential deadlock or crash. Further, the two communications avoid backpressure caused by a lack of entries in the send queue scheduler buffer.

Although FIG. 6 shows writing new commands or doorbells back to host memory, when a potential deadlock is detected, a subset of the doorbells in the send queue scheduler buffer may be written to the doorbell overflow buffer in host memory. Specifically, the subset of doorbells is selected from the send queue scheduler buffer. The subset of doorbells may be selected based on one or more attributes of each of the doorbells in the subset. For example, an attribute may be that the subset corresponds to the last doorbells received. By way of another example, the subset may correspond to queue pairs that have the most number of commands in the doorbell overflow buffer. Other attributes of each doorbell in the subset may be considered without departing from the scope of the invention.

Continuing with the discussion, each doorbell in the subset is written to the doorbell overflow buffer in host memory. Writing the doorbell to the doorbell overflow buffer may be performed using an RDMA write by the send queue scheduler. Once the doorbell is written to host memory, the doorbell in the subset is discarded from the send queue scheduler buffer by the send queue scheduler. Discarding the doorbell may be performed as discussed above with reference to FIG. 6.

FIG. 7 shows a flowchart for processing commands after avoiding deadlock in one or more embodiments of the invention. Specifically, FIG. 7 shows a flowchart for the send queue scheduler to start processing doorbells from the doorbell overflow buffer in one or more embodiments of the invention. In Step 701, a determination is made as to whether resources are available. In one or more embodiments of the invention, the send queue scheduler starts processing doorbells when the send queue scheduler has freed a sufficient number of resources in the send queue scheduler buffer. For example, if more than a threshold number of entries for writing doorbells in the send queue scheduler buffer are available and/or when more than a threshold number of dedicated collect buffers are available. The threshold number of entries may be the same value or a different value than the threshold number of dedicated collect buffers. Further, the threshold numbers may be the same or different from the threshold number discussed above with reference to FIG. 6. For example, the send queue scheduler may be in a state in which it is processing new doorbells that are newly added to the send queue scheduler buffer while the send queue scheduler has existing doorbells in the doorbell overflow buffer on host memory.

The threshold numbers in FIG. 7 may be configured on the HCA. The configuration of the threshold number(s) may be adaptive and performed by the HCA. Alternatively or additionally, the configuration of the threshold number(s) may be performed by a process on the host. If resources are not available, the send queue scheduler continues processing doorbells in one or more embodiments of the invention.

In Step 703, if resources are available, then the send queue scheduler reads the queue pair identifier and sequence number from the doorbell in host memory. Specifically, the send queue scheduler buffer issues a read request to read the next doorbell. The read request may be in the form of a DMA request to host memory that specifies the location of the next doorbell in the doorbell overflow buffer.

Further, in Step 705, the send queue scheduler identifies the send queue corresponding to the queue pair identifier. Based on the send queue, the send queue scheduler updates the linked list such that the last send queue descriptor currently in the list references the next send queue descriptor corresponding to the send queue.

When the send queue processes the command from the linked list, in Step 707, the send queue scheduler reads the command corresponding to the sequence number from the send queue and writes the command to the collect buffer in one or more embodiments of the invention. Steps 705 and 707 may be performed as discussed above with reference to FIG. 5.

The following example is for explanatory purposes only and not intended to limit the scope of the invention. In the following example, consider the scenario in which multiple processes on host memory are writing commands to the HCA. While the multiple processes are writing commands, the HCA is processing the commands. Specifically, when the physical collect buffers in the buffer pool are available, the commands are written to the physical collect buffers. When the physical collect buffers are not available, doorbells for the commands are written to the send queue scheduler buffer.

Because of the number and order of commands, in the example, the number of available resources on the send queue scheduler becomes limited. Specifically, the send queue scheduler processing doorbells by adding to the linked list cannot keep up with the number of doorbells being written to the send queue scheduler buffer. Thus, a potential deadlock is detected. The detection of the potential deadlock causes the send queue scheduler to start writing doorbells back to host memory. Even though the writing of doorbells back to host memory causes a triplicate write for the same command, the writing of doorbells back to host memory allows the send queue scheduler, in the example, to catch up on processing doorbells and, thus, prevents deadlock in one or more embodiments of the invention. When the processes on the host slow down in the number of commands being sent, the send queue scheduler starts processing doorbells from the doorbell overflow buffer in host memory in one or more embodiments of the invention. Thus, the doorbells are processed while avoiding deadlock.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing commands in a host channel adapter (HCA), comprising:
   receiving, for a plurality of commands, a plurality of doorbells for writing to a send queue scheduler buffer on the HCA, wherein the send queue scheduler buffer is associated with a send queue scheduler;
   detecting a potential deadlock of the send queue scheduler from processing a portion of the plurality of doorbells;
   writing a subset of the plurality of doorbells to a doorbell overflow buffer on a host, operatively connected to the HCA, based on detecting the potential deadlock;
   discarding, from the HCA, the subset of the plurality of doorbells by the send queue scheduler, after writing the subset of the plurality of doorbells to the doorbell overflow buffer, without processing the subset of the plurality of doorbells before discarding; and
   processing, from the doorbell overflow buffer on the host, the subset of the plurality of doorbells, after discarding the subset of the plurality of doorbells from the HCA, as resources of the HCA become available.

2. The method of claim 1, wherein the plurality of commands are written to a send queue on the host.

3. The method of claim 1, further comprising:
   processing a remaining set of the plurality of doorbells after discarding the subset of the plurality of doorbells, wherein processing the remaining set comprises for each doorbell in the remaining set:
      obtaining, from the doorbell, an identifier of a location in the send queue storing the command,
      locking an available collect buffer on the HCA to obtain a locked collect buffer,
      writing a command from the location to the locked collect buffer,
      processing, from the locked collect buffer, the command to generate a packet,
      issuing the packet to a port to send on a network,
      writing a completion to host memory for the packet, and
      releasing the locked collect buffer after writing the completion.

4. The method of claim 3, wherein the available collect buffer is dedicated to the send queue scheduler.

5. The method of claim 1, wherein detecting the potential deadlock comprises:
   identifying a number of available collect buffers and a number of available entries in the send queue scheduler buffer; and
   detecting the potential deadlock when the number of available collect buffers is less than a first threshold and the number of available entries is less than a second threshold.

6. The method of claim 1, wherein each doorbell of the plurality of doorbells comprises a queue pair identifier and a sequence number.

7. A host channel adapter (HCA) for processing commands, comprising:
   a send queue scheduler buffer configured to store at least a portion of a plurality of doorbells corresponding to a plurality of commands; and
   a send queue scheduler, operatively connected to the send queue scheduler buffer, and configured to:
      receive, for the plurality of commands, the plurality of doorbells for writing to the send queue scheduler buffer;
      detect a potential deadlock of the send queue scheduler from processing the portion of the plurality of doorbells;
      write, based on detecting the potential deadlock, a subset of the plurality of doorbells to a doorbell overflow buffer on a host operatively connected to the HCA;
      discard, from the HCA, the subset of the plurality of doorbells, after writing the subset of the plurality of doorbells to the doorbell overflow buffer, without processing the subset of the plurality of doorbells before discarding;
      issue a read request to the host to obtain a doorbell of the subset of the plurality of doorbells, from the doorbell overflow buffer on the host, as resources of the HCA become available; and
      process the doorbell, after discarding the subset of the plurality of doorbells from the HCA.

8. The HCA of claim 7, wherein the send queue scheduler is further configured to:
   process a remaining set of the plurality of doorbells after discarding the subset of the plurality of doorbells, wherein processing the remaining set comprises for each doorbell in the remaining set:
      obtaining, from the doorbell, an identifier of a location in the send queue having the command,
      locking an available collect buffer on the HCA to obtain a locked collected buffer,
      writing a command from the location to the locked collect buffer,
      processing, from the locked collect buffer, the command to generate a packet,
      issuing the packet to a port to send on a network,
      writing a completion to host memory for the packet, and
      releasing the locked collect buffer after writing the completion.

9. The HCA of claim 8, wherein the available collect buffer is dedicated to the send queue scheduler.

10. The HCA of claim 7, wherein detecting the potential deadlock comprises:
   identifying a number of available collect buffers and an number of available entries in the send queue scheduler buffer; and
   detecting the potential deadlock when the number of available collect buffers is less than a first threshold and the number of available entries is less than a second threshold.

11. The HCA of claim 7, wherein each doorbell of the plurality of doorbells comprises a queue pair identifier and a sequence number.

12. A system for processing commands, comprising:
   a host comprising a doorbell overflow buffer; and
   a host channel adapter (HCA) comprising:
      a send queue scheduler buffer configured to store at least a portion of a plurality of doorbells corresponding to a plurality of commands; and
      a send queue scheduler, connected to the send queue scheduler buffer, and configured to:
         receive, for the plurality of commands, the plurality of doorbells for writing to the send queue scheduler buffer;
         detect a potential deadlock of the send queue scheduler from processing the portion of the plurality of doorbells;
         write a subset of the plurality of doorbells to the doorbell overflow buffer on the host based on detecting the potential deadlock;
         discard the subset of the plurality of doorbells, after writing the subset of the plurality of doorbells to the doorbell overflow buffer, without processing the subset of the plurality of doorbells before discarding;
         issue a read request to the host to obtain a doorbell of the subset of the plurality of doorbells, from the doorbell overflow buffer on the host, as resources of the HCA become available; and
         process the doorbell, after discarding the subset of the plurality of doorbells from the HCA.

13. The system of claim 12, wherein the send queue scheduler is further configured to:
   process a remaining set of the plurality of doorbells after discarding the subset of the plurality of doorbells, wherein processing the remaining set comprises for each doorbell in the remaining set:
      obtaining, from the doorbell, an identifier of a location in the send queue having the command,
      locking an available collect buffer on the HCA to obtain a locked collected buffer,
      writing a command from the location to the locked collect buffer,
      processing, from the locked collect buffer, the command to generate a packet,
      issuing the packet to a port to send on a network,
      writing a completion to host memory for the packet, and
      releasing the locked collect buffer after writing the completion.

14. The system of claim 13, wherein the available collect buffer is dedicated to the send queue scheduler.

15. The system of claim 12, wherein detecting the potential deadlock comprises:
   identifying a number of available collect buffers and an number of available entries in the send queue scheduler buffer; and
   detecting the potential deadlock when the number of available collect buffers is less than a first threshold and the number of available entries is less than a second threshold.

16. The system of claim 12, wherein each doorbell of the plurality of doorbells comprises a queue pair identifier and a sequence number.

17. The system of claim 12, wherein the host further comprises a send queue configured to store the plurality of commands.

* * * * *